(12) United States Patent
Pierson

(10) Patent No.: US 7,349,393 B2
(45) Date of Patent: Mar. 25, 2008

(54) METHOD AND SYSTEM FOR IMPLEMENTING AN IMPROVED UNIVERSAL PACKET SWITCHING CAPABILITY IN A DATA SWITCH

(75) Inventor: Forrest L. Pierson, Dallas, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1018 days.

(21) Appl. No.: 10/078,175

(22) Filed: Feb. 15, 2002
(Under 37 CFR 1.47)

(65) Prior Publication Data

US 2003/0048781 A1 Mar. 13, 2003

Related U.S. Application Data

(63) Continuation-in-part of application No. 09/452,956, filed on Dec. 2, 1999, now Pat. No. 6,683,869.

(51) Int. Cl.
*H04L 12/56* (2006.01)
(52) U.S. Cl. .................................. 370/392; 370/428
(58) Field of Classification Search ........ 370/353–354, 370/389, 392, 394
See application file for complete search history.

(56) References Cited

U.S. PATENT DOCUMENTS

| | | | | |
|---|---|---|---|---|
| 4,539,676 A | * | 9/1985 | Lucas | 370/354 |
| 4,697,281 A | * | 9/1987 | O'Sullivan | 455/557 |
| 5,377,189 A | | 12/1994 | Clark | |
| 5,467,344 A | * | 11/1995 | Solomon et al. | 370/396 |
| 5,600,630 A | * | 2/1997 | Takano et al. | 370/218 |
| 5,719,858 A | | 2/1998 | Moore | |
| 5,771,232 A | * | 6/1998 | Sinibaldi et al. | 370/384 |
| 5,787,071 A | * | 7/1998 | Basso et al. | 370/231 |
| 6,154,770 A | * | 11/2000 | Kostakos | 709/217 |

(Continued)

FOREIGN PATENT DOCUMENTS

EP 908830 A1 * 4/1999

(Continued)

OTHER PUBLICATIONS

"ICs for Communications, Advanced CMOS Frame Aligner ACFA, PEB 2035 Data Sheet 01.94", 1994.*

(Continued)

*Primary Examiner*—Edan Orgad
*Assistant Examiner*—Salman Ahmed

(57) ABSTRACT

A system and method for moving voice telephone calls through a data network. More particularly, the system and method are directed to the efficient operation of using identification numbers to route data packets through a communications node without reformatting individual data packets to the native protocol of that communications node. The exception is when the data packet will be more efficiently handled within the overall communications network by routing different pieces of that data packet to different outgoing port cards in a particular communications node, then the data packet will be reformatted, if necessary, to the native protocol of that communications node. The system and method allow the outgoing port card to convert the data packet into the correct format for transmission to either the destination (customer) or the next communications node. Together port cards and data switches form nodes. The port card receives and transmits out signals through respective ports connected to links between nodes.

10 Claims, 6 Drawing Sheets

U.S. PATENT DOCUMENTS

| | | | |
|---|---|---|---|
| 6,195,359 B1 * | 2/2001 | Eng et al. | 370/401 |
| 6,249,527 B1 | 6/2001 | Verthein et al. | |
| 6,275,864 B1 * | 8/2001 | Mancusi et al. | 709/250 |
| 6,836,515 B1 * | 12/2004 | Kay et al. | 375/260 |
| 6,909,697 B1 * | 6/2005 | Langley | 370/252 |
| 7,012,919 B1 * | 3/2006 | So et al. | 370/392 |
| 7,065,079 B1 * | 6/2006 | Patra et al. | 370/390 |
| 7,145,904 B2 * | 12/2006 | Zhao et al. | 370/371 |
| 2003/0128703 A1 * | 7/2003 | Zhao et al. | 370/392 |
| 2005/0074001 A1 * | 4/2005 | Mattes et al. | 370/389 |
| 2006/0251419 A1 * | 11/2006 | Zadikian et al. | 398/51 |
| 2007/0014275 A1 * | 1/2007 | Bettink et al. | 370/351 |
| 2007/0140122 A1 * | 6/2007 | Murthy | 370/231 |
| 2007/0147238 A1 * | 6/2007 | Kadambi et al. | 370/229 |

FOREIGN PATENT DOCUMENTS

| | | | |
|---|---|---|---|
| WO | WO930357 | * | 2/1993 |

OTHER PUBLICATIONS

A. Charney; Providing QoS Guarantees in Input Buffered Crossbar Switches with Speedup; Source Technical Report: TR-779; Publisher Massachusetts Institute of Technology Cambridge, MA, USA Year of Publication: 1998.*

Souza et al. GIGAswitch System: A High-performance Packet-switching Platform; Copyright 1994 Digital Equipment Corporation.*

* cited by examiner

METHOD AND SYSTEM FOR IMPLEMENTING AN IMPROVED UNIVERSAL PACKET SWITCHING CAPABILITY IN A DATA SWITCH

This application is a continuation-in-part of application Ser. No. 09/452,956, filed on Dec. 2, 1999, which is hereby incorporated by reference in its entirety.

I. BACKGROUND OF THE INVENTION a. Field of the Invention

The present invention relates generally to passing voice communications over a data communications network such as an asynchronous communications network or a synchronous communications network.

b. Background Information

Almost all customers of data traffic today have additional, separate links to carry voice. This is inefficient for the customer and the communications provider (or carrier). Many are seeking techniques that place Ds0 (or voice) channels in data packets for transmission over a data link, so that they can remove their voice links.

A communications network serves to transport information among a number of locations. The information is usually presented to the network in the form of time-domain electrical signals and can represent any combination of voice, video, or computer data. A typical communications network consists of various physical sites called "nodes," interconnected by conduits called "links." Each link carries information from one site to another site. End user sites may contain data terminating equipment (DTE) for combining, separating, and transforming data with or without voice. Network provider sites usually include either edge switches, with user network interfaces (UNI), or backbone switches, which only connect to other backbone switches and, edge switches and do not contain UNI.

Voice information is carried via a Ds0 channel that is a 64 kilobits per second (64 Kbps) channel and also the world-wide standard for digitizing voice conversation. The channel throughput is 64 Kbps because a digital data stream can adequately represent an analog voice signal if sampled at a rate of 8000 samples per second. If each voice sample is digitized using 8 bits, this results in a digital data stream of 64 Kbps. Since Ds0 is a synchronous TDM (time-division multiplexing) link, once a channel connection has been setup between two users, that channel is dedicated until the connection is torn (or brought) down, and cannot be used by anything or anybody else even if there is silence in the line.

Data currently is transmitted between nodes either as synchronous or asynchronous. In a synchronous network using Synchronous Transfer Mode (STM), each timeslot is assigned a certain time when it is to arrive at each node. The time when the timeslot arrives determines where the timeslot goes. Thus, the individual timeslots do not need to have routing information within them.

Asynchronous Transfer Mode (ATM), Frame Relay (FR), and Internet Protocol (IP) are considered asynchronous protocols because each node in the network does not know until after a data packet arrives where it is intended to go. The arrival of a particular data packet at a node, on the other hand, is not guaranteed to occur at a particular point in time. Only by analyzing the routing information in the header can the data switch know where to route the data packet.

ATM is designed to be carried over the emerging fiber optical network, called the Synchronous Optical NETwork (SONET), although it can be carried over almost any communications link. The basic unit of ATM is a data packet called the ATM cell. Each cell contains two parts, a header, which contains routing information, and a payload, which contains the data to be transported from one end node to another. The ATM cell is always the same size.

Frame Relay (FR) and Internet Protocol (IP) are communications protocols. Each is similar to ATM in that they also consist of a data packet. However, they differ from ATM in that their packet size can vary from packet to packet, and both can be considerably larger than ATM. This allows them to make more efficient use of the bandwidth of the communications media they travel over, but it makes receiving them more difficult in that the packet size must be calculated for each packet. Both the FR and IP may be used in point to point connections, but IP may also be used when multiple ports are connected to a single transmission medium.

Data can consume as much or as little as is needed for carrying actual traffic, because data does not reserve a fixed amount of bandwidth per link. While voice will never overload, or oversubscribe, the capacity of its links, there are mechanisms in place to handle data overloads when the amount to be transmitted is more than a physical link can carry. It is these mechanisms that allow data network designers to specify more data demand than capacity to carry, which is a process called statistical multiplexing.

Statistical multiplexing is the concept of giving multiple customers, in sum total, more bandwidth through a physical connection than the physical connection can carry. This is also known as over-subscribing. Studies have shown that customers will not always use all of the bandwidth their carrier has set aside for them. It is during this period of non-use by a customer that spare bandwidth is available for over-subscription. If sufficient numbers of customers are placed on a single physical connection, then large quantities of spare bandwidth can be realized.

When traffic is isolated among two or more physical connections, less statistical multiplexing can occur, as customers on one connection cannot use spare bandwidth on another connection. By joining more customers into a single, large connection, better statistical multiplexing occurs and the carrier is able to sell more bandwidth on one high-speed physical connection than on several smaller connections whose sum is equal to the one high-speed connection.

There are different ways of handling overloads in the data network. In ATM, the network is designed with large buffers that absorb the excess traffic, queueing it up until capacity is available to place the traffic through the network. The traffic that is delivered out of its buffers first is determined by the quality of service (QOS) the customer has paid the carrier to provide. Higher QOS traffic is removed from its buffers before lower QOS traffic. This is important for real time applications such as voice or interactive TV services, which must get through the network with a minimum amount of delay.

In those instances where so much excess traffic is delivered that the network cannot queue it up in buffers, the lower QOS traffic is deleted, or dropped, from the buffers to make room for higher QOS traffic to be queued up. Ideally, customer end-to-end protocols will detect this loss of traffic and will re-transmit the lost information.

An emerging standard in the IP network uses a different approach to handling overloads. In IP, there is no QOS as in ATM. Once a data packet is injected into the IP network, it will be given equal priority with all other traffic and delivered to its destination with a minimum of delay.

In an IP network, the traffic density in a link is closely monitored. As it begins to approach the link capacity, the IP data switch sends congestion notices back towards the data sources telling them to slow down the amount of data they send. Each notice will, for a limited length of time, force the data source to restrict what it sends out. As link traffic gets closer and closer to link capacity, more of these messages are sent backwards. When an IP switch receives congestion notices and reduces the rate of transmission, it may experience congestion as well and will send congestion notices back to its sources.

Eventually, the notices reach the traffic origins and/or customers. The customer premise equipment must then cut back on what is sent into the network, and must decide which traffic it puts out has the highest priority so that it goes out while the lower priority traffic has to wait. Thus, the IP network passes the job of determining traffic priority to the customer. If a customer has a great deal of high priority traffic, it may pay a premium to not receive as many congestion notices when congestion hits the network as another customer may pay, so that it will get more guaranteed traffic during congestion.

The IP data switches also usually maintain small buffers, but these are designed exclusively to handle the small, temporary overloads that occur until the congestion notices are responded to and reduced traffic flows into the switch.

These two different means of determining traffic priority are given as an example only. Whatever the mechanism, voice will usually be given a higher priority than data. By ensuring that the voice traffic does not physically exceed the capacity of the network links, the network systems engineering team can ensure all voice gets through, squeezing out the needs of data traffic. This allows the physical links to stay at or close to capacity even as the demands of Ds0 change. This spreads the cost of the links out over more traffic, reducing the cost per data packet and thus making the network more efficient than dedicated links carrying voice alone can be.

Each of ATM, FR, and IP has certain benefits and certain disadvantages. By utilizing these protocols in areas where their benefits can be utilized to the maximum efficiency while minimizing the losses incurred from their disadvantages, a more efficient network is realized.

Because of its fixed sized packet, ATM is more attractive on the higher speed links where it is considerably less expensive to design hardware to receive a fixed sized packet than a variable sized packet. On the lower speed, but higher per-bit cost links, FR and IP are more attractive because of their line utilization efficiency. At these lower speeds, the cost difference between a port that can receive variable sized packets versus one that only has to receive fixed size packets is usually more than offset by the fact that there are no segmentation and reassembly functions that have to be performed. Segmentation and reassembly, both of which are discussed later, are needed when a variable sized message is placed in multiple data packets, which is necessary with ATM.

Improvements in the state of the art of design technology are making the segmentation and reassembly functions less expensive. On the other hands, similar improvements are making it easier to design IP and FR receivers that can operate at SONET rates. What will likely happen is that the industry will see ATM, which is maturer than IP, dominate the high-speed market for the next 5 to 10 years. After that time period, IP, which has a simpler and less expensive congestion management scheme than ATM, most likely will become the dominant mechanism in high-speed traffic.

Procedures have been developed that allow the packets carried by one protocol to be translated into other protocols, because of the existence of different protocols for transferring data packets between nodes. To date most efforts have evolved around carrying IP or FR traffic over ATM, mainly because ATM has a mature, accepted standard for carrying different traffic types over the same, high speed fibers. However, it is theoretically possible to have a situation where a data packet of any protocol may be carried by another protocol.

Conversions between these protocols usually will follow one of four procedures, each of which require processing resources to occur. The first procedure is segmentation, which involves breaking large payloads into smaller payloads for inclusion in smaller packets. The second procedure is reassembly, which involves putting segmented payloads back together into their original payload. The third procedure is encapsulation, which involves adding additional overhead to a payload to transport the payload through a medium or protocol that otherwise could not handle the payload. The fourth procedure is extraction, which involves removing the encapsulation from an encapsulated payload after it has been transferred to its destination.

Segmentation occurs when the protocol to be converted into has smaller payloads than the protocol being converted from. In segmentation, the data packet is broken up into a series of smaller packets, each of which is just large enough to fit into the payload of the converted to protocol. If overhead is added to each segmented part of the packet, then the individual segments are even smaller to make room for the overhead.

An example of such segmentation is the conversion of a FR packet into ATM Adaptation Layer (AAL)-3/4. In AAL-3/4, the 48-byte payload of the ATM cell will carry 4 bytes of overhead and 44 bytes of the segmented data packet. AAL-3/4 contains overhead that identifies if the ATM cell carries the first segmented packet, neither the first nor last (i.e., a middle packet), the last segmented part of a packet, or, if the FR packet happens to be small enough to fit entirely in a single ATM payload, the only segmented part of a packet.

A more efficient AAL technique is called AAL5 (or the Simple Efficient ATM Layer (SEAL)). In this technique, the ATM cell header has a reserved code word that can take one of two states. The cell is either the last cell of a packet, or it is not the last cell of a packet. All 48 bytes of the payload can carry segmented parts of the packet without any overhead. The start of a new packet is indicated when a non-last ATM cell immediately follows a last ATM cell, indicating that a new packet has occurred. When the final segment of a packet arrives, it will be carried in a last cell of a packet type ATM cell. If the packet happens to be small enough to fit entirely in a single ATM payload, then the cell that carries that packet will be an end of packet cell and will have followed another end of packet cell.

IP takes a similar approach to segmentation. It has built into its header information on the segmentation process, and thus can segment itself as it is passed along. This is primarily to benefit IP routing nodes that cannot handle large IP packets. These nodes will break a large packet up into smaller packets before processing them. Although other nodes can reassemble these packets back together again, because they are already in IP format they usually just continue to pass them on to the next node, leaving the entire reassembly process up to the final destination. This process can also break IP packets (which can be in excess of 65,000 bytes in length) into smaller packets that can be carried by a frame relay packet, which is limited to packets slightly larger than 8,000 bytes.

Any protocol whose packet size is smaller than the packet size of another protocol it will carry will need to employ some form of segmentation to carry the other protocol.

Reassembly is the opposite of segmentation. In reassembly, a segmented data packet is removed from the payloads of the protocol that was carrying it and reassembled into its original form.

Reassembly is especially useful when converting from ATM to FR or IP, because many FR and IP receivers have a limited amount of packet processing capability. Numerous, small packets could overwhelm individual FR or IP receivers. By having the node that is converting from ATM to FR or IP reassemble the packet from the payloads of the ATM cell, the receiving end that subsequently gets those packets will have fewer packets to process than it took ATM cells to carry the packet to the converting node.

In encapsulation, a packet to be carried over another protocol is placed inside the overhead of the protocol to make it conform to the carrying protocol's standards. Two examples of encapsulation previously discussed are: 1) the AAL-3/4 cell that carries the only segmented packet of a data packet; and 2) the AAL-5 cell that carries the last cell of a segment and immediately follows another AAL-5 cell that also carried the last as cell of a segment.

Most IP data packets are nowhere near their maximum capable size and for this reason can be easily encapsulated in a FR packet.

Extraction is the opposite of encapsulation. The encapsulation is stripped away to reveal the original packet. For instance, a local area network (LAN) using IP based traffic sends a packet bound for a distant destination to its edge router or customer premise equipment (CPE). The CPE uses FR to communicate to the network, so it encapsulates the IP packet into a FR packet for transmission into the network. At the other end the FR layer around the IP packet is removed, thus extracting the IP packet to be sent to its destination.

There are a variety of conduits to transport or move data packets between two locations with each way having particular features. On a bit per bit basis, it is significantly less expensive to transmit data over fiber than using metallic links by several factors of ten. The theoretical capacity of fiber is in excess of 20 tera bits per second (20 million million bits per second). Current standards are 10 thousand million bits per second (gigabits per second or gbps), and will soon increase to 40 thousand million bits per second. Furthermore, technology is also improving on the ability of a single fiber to carry numerous wavelengths or colors. Each wavelength can carry 10 gbps independently of what the other wavelengths in the fiber are doing.

On the other hand, metallic links that can span long distances and are reasonable to manufacture have long ago reached their theoretical limits of roughly 500 million bits per second. They are much bulkier than fiber optic links. The metallic link is also susceptible to rust and corrosion, whereas the fiber optic link is relatively chemically inert.

A T1 link, which is an example of a metallic link, transmits one T1 frame 8000 times per second (or one frame every 125 μs). Each T1 frame contains a T1 payload with 24 Ds0 timeslots, one for each Ds0 channel with 8 bits in each timeslot. Each T1 frame also has a T1 frame bit that identifies the start of the T1 frame, so that a T1 frame has a total size of 193 bits. This results in a data stream of 1.544 Mbps (8000 frames/sec·193 bits/frame).

Repeaters, which re-amplify the signal, are needed to prevent signal attenuation (loss of signal strength as a signal travels down a link) on either type of link. Metallic links attenuate the signals more than do fiber optic links, so more repeaters for metallic links are needed than for fiber optic links for a given distance. For instance, a T1 link can span a maximum of just over one mile (6000 feet) before a repeater is needed; for T3, the range is less than 1400 feet. It is not unusual for fiber optic links to span 50 to 100 miles between repeaters. Fiber optic links also cost less per foot physically than metallic links do, and the connectors at each end of a fiber optic link are similar in price to the connectors of a metallic link. Given the longer span between repeaters, this translates into fewer connectors, and hence lowers the cost, for fiber optic links.

While metallic interfaces on port cards and repeaters are less expensive than fiber optic interfaces, the cost difference does not justify the reduced number of repeaters in a fiber optic network, nor does it justify the more expensive cabling needs even inside a switching facility. Further, the limited range of T3 metallic links has impacted the designs of several switching facilities, whereas the range of fiber optic links does not factor into their design.

c. Related Art

A data switch routes data packets from incoming ports to outgoing ports through a data switching matrix usually using an identification number. The concept of the identification number associated with the carrying of a data packet within a data switch is a commonly used technique to indicate to other node components the destination port card for the data packet. Most such identification numbers are nothing more than series of bits that specify the outgoing port(s) the data packet is destined for and a priority level for determining what queue it should be stored in until departure. The identification number does not effect the processing of the data packet or whether the data packet will be changed to accommodate the native protocol being used by different node components.

There are numerous designs for data switch matrices of which only two will be discussed below.

One data switching matrix is a dedicated matrix that receives data packets from every incoming port card (or port interface), buffers them, and then routes them to their intended outgoing data port. Because multiple incoming packets may be destined for each outgoing data port, the links to the outgoing ports contain buffers in them that allow the data packets to accumulate until they can be delivered to the outgoing port card.

Another design uses a high-speed backplane as the delivery mechanism and circuits on each port card to examine, then accept or reject each packet. This scheme is easier to implement, but requires advanced technology to deliver high data volumes from all incoming ports to all outgoing ports. Such technologies, including low voltage differential swing (LVDS), have recently become available.

Regardless of the method used, the data switching matrix can deliver a data packet from any source to any destination. Nor is the data packet limited to a single destination. Sending a data packet to multiple destinations is called multi-casting or broadcasting. Applications that might use this feature would be updates of database copies to allow local access to the database in different, distant areas, the transmission of entertainment services to multiple destinations, etc.

A data switch cannot switch individual Ds0 channels within a data packet unless a Ds0 switch with a Ds0 switching matrix is added to the data switch. Presently, there are two primary architectures for placing a Ds0 switch in a data switch.

The first concept places the Ds0 switch inside the data switch such that it does not occupy the physical space of an external port, but it consumes resources from the data switch as if it were an external port card. As a result, the Ds0 switch still consumes a port interface that reduces the number of external ports the matrix can otherwise support. Many designs call for installing a large Ds0 switching matrix in the slot of a port card or some other means of having the Ds0 switching matrix attach to the data switching matrix in a fashion similar to a port card. Such Ds0 switches consume resources and bandwidth within the data switch that reduces the number of port interfaces available to the data switch, increasing the costs per port of the remaining port interfaces on the data switch. A centrally located Ds0 switching matrix must be able to handle large quantities of Ds0 channels concurrently, which requires a great deal of bandwidth out of the data matrix, and a larger amount of memory than if the load is shared across each port card. The alternative to a large Ds0 switching capacity is to limit the Ds0 switching capacity of the data switch to a small fraction of the overall capacity of the data switch.

Existing designs are inefficient in a number of areas. In one area, any Ds0 channel that has to be extracted from a data packet passes through the data switching matrix twice. This is because the Ds0 switching matrix is designed as an afterthought, and takes on the appearance of another port card in the data switch. Thus, the first time the Ds0 channel passes through the data switching matrix is when it is routed to the Ds0 switching matrix. The second time occurs after the Ds0 switching matrix has extracted the Ds0 channel, switched it around, and then placed it into a new data packet and returned it to the data switching matrix to be routed to the appropriate outgoing port.

The second concept places the Ds0 switch on the port card sequentially between the incoming port and the connection to the data switching matrix to provide processing for information flows entering the data switch only. This concept solves the efficiency problems stated previously. However, this concept makes it impossible to combine Ds0 channels from different incoming ports into a single data packet. In data switches carrying a large amount of Ds0 traffic, this approach may lead to several problems. The first problem is that the likelihood of blocking, or the inability to find, a dedicated 64 kbps Ds0 path through the switch increases. Second, this inability to combine incoming Ds0 channels leads to the creation of many smaller data packets, which increases demand on the header processing circuitry of the network if the data packets are of variable size, or the creation of data packets with unused payload space if the packets are of a fixed size. Third, the inability to combine Ds0 channels may lead to latency, or the addition of more delay, between the source and the destination of a Ds0 channel. For instance, round trip delays starting around 140 ms, and definitely in excess of approximately 200 ms or more will affect the spontaneity of a conversation. With the inability to bundle all Ds0 channels together, more data switches must process the Ds0 channels through their Ds0 switching matrixes, increasing delay. Fourth, this design does not lend itself easily to combining channels together to maximize the use of switch and network resources, to testing, and to decreasing delays for Ds0 traffic. Fifth, the design prevents reasonable path verification and bit error rate (BER) tests on the Ds0 switching matrix.

Ds0 switching nodes (Ds0 switches) contain a switching matrix that is used to route Ds0 samples from any timeslot of any incoming link to any timeslot on any outgoing link. An example of such a switching matrix is a single stage Time Slot Interchange (TSI) matrix. A TSI matrix places all incoming Ds0 samples from all incoming links into pre-defined locations in a randomly accessible memory (RAM). This RAM is frequently referred to as the data RAM. Many designs also place in parallel with the Ds0 channel internal status concerning the Ds0 channel in the same location in the data RAM.

A second RAM, called a control RAM, contains connection information and is used to provide a lookup address into the data RAM. Each location in the control RAM represents what an outgoing timeslot on a particular outgoing link will carry. Each location in the control RAM will address a location in the data RAM, and thus connect a particular incoming timeslot of an incoming link with an outgoing timeslot of an outgoing link. The control RAM may also possess additional control bits associated with the outgoing timeslot.

The contents of the control RAM are read out in a predetermined pattern. By following this pattern, internal timing designs within the node will assure that the intended incoming timeslot represented in the data RAM is presented to the intended outgoing timeslot.

The most efficient design for a TSI switching matrix is achieved when all Ds0 channels can be physically stored in a single RAM. If the number of Ds0 channels exceeds the limits of a single RAM, then the amount of RAM needed is the square of the number of RAM needed to store all the Ds0 channels once. This is because the job of selecting outgoing channels has to be split up among two or more identical circuits. Each outgoing circuit needs its own dedicated copy of each incoming channel in order to function without any possibility of contention occurring between it and another outgoing circuit for the same data RAM.

Today's state of the art can write or read (access) a RAM approximately 16,384 times (16K; "K" denotes 1024, or $2^{10}$) in a 125 µs time period. If there are 32K Ds0 channels, then four memories are needed. Two RAMs are needed to store all 32K channels, splitting the channels between the two RAMs. This number must then double because there will be two outgoing circuits and each needs all 32K incoming channels available to it; therefore each incoming channel has to be duplicated into two sets of RAMs. If there were 48K channels there would have to be nine sets of RAMs, and if there were 64K channels there would have to be 16 sets of RAMs. There are a variety of schemes for Ds0 switching matrix design beyond this example.

Another area existing designs are inefficient in is that in order to handle large numbers of Ds0 channels to take advantage of the statistical multiplexing of a large, integrated network, a large switching matrix on the order of 256K to 1024K Ds0 channels must exist in the switch. This large matrix must take in large amounts of data packets, break out the Ds0 channels within them, route them through the matrix, make new data packets, and send them back through the switch to the destination port. As stated earlier, current Ds0 switching technology can only access a RAM 16K times in a 125 µs time period. Because of the squaring problem discussed earlier, a 256K Ds0 channel matrix would take 256 data RAMs to provide for a TSI switching matrix to handle all connections.

Where a data switch is adapted to route different types of packets concurrently, i.e., ATM, Frame Relay, or Internet Protocol, the design of the switch is such that only one type of packet is switched, and the other packet formats are converted into the designated format for switching. However, this leads to inefficiencies when port cards, which carry packet types that are not native to the switching matrix of the data switch, must convert the packet type of that port card to the designated packet format of the switch. When two such port cards are passing packets between themselves, they must convert to the other protocol, and then re-convert back to their own format. This introduces additional time delays and packet handling complexities throughout the communications network. It can also increase the amount of traffic carried in the data switching matrix by more than would otherwise be carried if the switching of packets occurred in the format of the port cards. In the case of IP packets or other protocols that can self-segment, the process can result in numerous smaller IP segments that increase the workload of a downstream communications node.

Another problem for the industry is that if a new protocol for the backbone transmission of data packets is developed, the conversion of the new protocol to the protocol of existing switches will result in inefficiencies carrying that protocol through the switching node. This also increases the bandwidth consumed through the switching matrix to pass certain amounts of data through the node. Many existing nodes would have to be replaced.

Notwithstanding the usefulness of the above-described voice switching matrices and port cards, a need still exists for placement of a Ds0 switch with a Ds0 switching matrix on a port card so that a node in a communications network will more efficiently handle voice communication. A Ds0 switching matrix is needed that is capable of reducing the processing load on a data switching matrix and attached port cards. Furthermore, an identification numbering system is needed to reduce the processing load on the node components and the transmission time of data packets in a format not native to all nodes within a communications network.

II. SUMMARY OF THE INVENTION

The present invention is directed to improving the efficiency of voice communication over a data communication network and thus gains additional efficiencies and economies of scale by providing one communications network instead of two separate communication networks for voice and data, respectively. Thus data packets may include voice channels, data, or any other type of service. The invention while addressing the problems of the prior art obtains advantages that were not achievable with the prior art. Additionally, a novel feature of this invention is the translation of the identification number, which is assigned upon arrival at a port card, as it passes from one section of the node to another section, and that the identification number also contains complex instructions on what to do with the data packet at each destination within the node.

In accordance with another aspect of the invention, an identification number preferably is assigned to each received data packet based on the contents of the data packet. The identification number preferably represents an address in a look-up table that provides instructions as to what to do with the data packet in terms of routing, format conversion, and other identification information.

In accordance with another aspect of the invention, a communications network preferably includes at least one link and at least two nodes. Each of the nodes preferably includes a data switch having a data switching matrix, a data bus connected to the data switch, and at least one port card connected to the data bus. Each of the port cards preferably includes a high speed data bus and a processor connected to the high speed data bus. The processor preferably assigns an identification to received packets, wherein the identification routes the received packets through the node. Each of the at least one link preferably is connected to at least two nodes.

In accordance with another aspect of the invention, a communications network node preferably includes a data switch, which includes a data switching matrix; a data bus connected to the data switch; and at least two port cards connected to the data bus, each of the at least two port cards includes a high speed data bus and a processor connected to the high speed data bus, the processor preferably assigns an identification to received packets, wherein the identification routes the received packets through the node.

In accordance with another aspect of the invention, a port card preferably includes a high speed data bus, an intake system connected to the high speed data bus, an outgoing system connected to the high speed data bus, a port control system connected to the high speed data bus, and a switch interface connected to the high speed data bus. The intake system preferably assigns an identification to each packet received by the intake system based on the packet.

In accordance with another aspect of the invention, a port card preferably includes means for receiving packets as at least one of an asynchronous transmission and a synchronous transmission, the receiving means includes means for assigning an identification to each received packet; means for transmitting packets as at least one of an asynchronous transmission and a synchronous transmission; means for interfacing with a data switch; and means for routing information between the receiving means, the transmitting means, the interfacing means, and the processing means. The routing means preferably routes packets based on the identification of the packet assigned by the assigning means.

In accordance with another aspect of the invention, a telecommunications network switching method preferably includes receiving a signal at a communications node, separating the signal into packets, assigning an identification to each packet based on a destination for the packet and content of the packet, routing packets based on the identification, removing the identification from each packet, and transmitting the packets as a signal to the next communications node.

In accordance with another aspect of the invention, a communications network node preferably includes: a data switch, the data switch includes a data switching matrix, a data bus connected to the data switch, and at least two port cards connected to the data bus, each of the at least two port cards includes a high speed data bus, and a Ds0 switch connected to the high speed data bus, the Ds0 switch includes a Ds0 switching matrix. The Ds0 switching matrix preferably disassembles and reassembles packets with Ds0 channels after receipt of the packet by the port card from at least one of a source other than the data switch and from the data switching matrix connected to the data bus based on the packet.

In accordance with another aspect of the invention, a port card preferably includes: a high speed data bus, an intake system connected to the high speed data bus, an outgoing system connected to the high speed data bus, a port control system connected to the high speed data bus, a switch interface connected to the high speed data bus, and a Ds0 switch connected to the high speed data bus; and wherein the Ds0 switch disassembles and reassembles packets after initial receipt of the packet by at least one of the intake system and the switch interface based on the packet.

In accordance with another aspect of the invention, a port card preferably includes: means for receiving packets as at least one of an asynchronous transmission and a synchronous transmission, means for transmitting packets as at least one of an asynchronous transmission and a synchronous transmission, means for interfacing with a data switch, means for processing packets having Ds0 channels, and means for routing information between the receiving means, the transmitting means, the interfacing means, and the processing means; and wherein the routing means routes packets having Ds0 channels at least in part based on the respective packet to the processing means after receiving the respective packet from at least one of the receiving means and the interfacing means.

In accordance with another aspect of the invention, a telecommunications network switching preferably method includes: receiving a signal at a communications node, separating the signal into packets, routing individual packets with Ds0 channels to a first Ds0 switch and switching the Ds0 channels into new packets headed to the same outgoing port of the communications node when the packet includes at least one Ds0 channel destined for another communications node, routing packets based on their destination to the appropriate transmission port, manipulating Ds0 channels of packets in a second Ds0 switch into at least one of larger packets, packets with more channels for fixed size packets, and packets destined for the same outgoing port at the next communications node, and transmitting the packets as a signal to the next communications node.

In accordance with another embodiment of the invention, a method for operating a port card preferably includes: receiving packets from a communications conduit, routing each packet based on the destination of that packet such that when the packet includes at least two Ds0 channels destined for at least two different transmission ports, the packet is routed through a Ds0 switch, when the packet includes only data, the packet is routed to a data switch, and when all Ds0 channels in the packet are directed to the same downstream communications node, the packet is routed to a data switch, interfacing with a data switch, routing each packet received from the data switch to the Ds0 switch when the packet includes at least one of at least two Ds0 channels destined for different outgoing ports and the packet contains insufficient Ds0 channels, and transmitting the packet into a communications conduit.

In accordance with an alternative embodiment of the invention, testing features are significantly enhanced and allow every data path to be easily accessible for verification. The design allows for an easy to implement method of performing bit error rate testing of the Ds0 switching matrix and other components on the port card. Testing can be conducted concurrently while carrying live traffic.

An objective of the invention is to provide for testing capabilities of the voice switching matrix while processing and transmitting real-time communications.

Another objective of the invention is to increase the throughput of a node to handle a larger volume of data packets arriving and departing over improved telecommunication links that provide increased capacity by reducing the amount of processing required to rout a data packet through that node.

A further objective of the invention is to reduce the number of networks connected to individual customers and managed by communications service providers.

A further objective of the invention is to have each Ds0 channel pass through the data switching matrix only once.

Yet another objective of the invention is to eliminate the need to replace data switches when the base data packet format (or protocol) changes to provide increase capacity for network transmissions.

An advantage of the invention in transmitting data over telecommunications links is that any type of service can be placed in the data packets including Ds0 channels.

Another advantage of the invention is a reduction and/or elimination in use of the data switching matrix resources and bandwidth by the Ds0 switching matrix while providing for a flexible and inexpensive Ds0 switching architecture.

Another advantage of the invention is that flexible, robust, and thorough built in self test features may be incorporated into the port card in an alternative embodiment.

A further advantage of the invention is that Ds0 channels are not duplicated and will not need to be rejected at those port cards that do not need them, because each port card rearranges Ds0 channels such that the data packets presented to the data switching matrix will only go to a single destination.

A further advantage of the invention is that the communications service provider reduces the operational cost of managing communications networks and thus of providing communication services to customers.

A further advantage of the invention is that no data packet can be considered "non-native" as the matrix switches packets based upon the packet identification number and boundary indicators, without any restrictions caused by the format of the packet. Any data packet of any format or size can pass through the data switch and potentially even the node unmodified. This reduces processing complexities in the handling of the data packet and allows for greater throughput.

A further advantage of the invention is that IP traffic does not need to be segmented into smaller IP packets in part at least because the invention can handle data packets of any size.

Yet another advantage of the invention is that any packet format is acceptable to the switching matrix and can be transferred through the switch without having to convert the packet to another format.

Yet another advantage of the invention is that larger packets, instead of a series of segmented packets, will pass through an ATM data switch and thus reduce resources used, because there will be fewer headers to be processed. Smaller savings are also realized when an encapsulated packet is removed from its encapsulation before passing through the switching matrix.

Yet another advantage of the invention is that the port card or the packet reception point in the node can selectively determine whether the data packet shall be transferred through the data switch without modification or if it will be converted into the format of the destination port card(s) before being sent through the data switching matrix.

The invention further provides for an expanded use of the identification number such that complex information about the packet is carried within it. This information can be used to perform protocol conversions or any of a number of other functions on the packet, as well as to selectively identify the destinations that will accept the packet.

An alternative embodiment of the invention provides for the port cards to selectively remove error check sequences within data packets to reduce their size and the bandwidth consumed as the data packet passes through the data switching matrix. The identification number will then indicate that the error check sequences have been removed.

Another alternative embodiment of the invention provides an advantage of the data switch and attached port cards are capable of switching large numbers of Ds0 channels without incurring the costs of providing for an "N squared" data RAM. When the Ds0 capacity of the switch exceeds the ability of a single data RAM to hold all Ds0 channels to be switched, only additional RAMs in proportion to the number of Ds0 channels are added, not in proportion to the square of the number of Ds0 channels.

Further features and advantages of the present invention, as well as the structure and operation of various embodiments of the present invention, are described in detail below with reference to the accompanying drawings.

III. BRIEF DESCRIPTION OF THE DRAWINGS

The present invention is described with reference to the accompanying drawings. In the drawings, like reference numbers indicate identical or functionally similar elements or steps.

IV. DETAILED DESCRIPTION OF THE INVENTION

Figure 1:
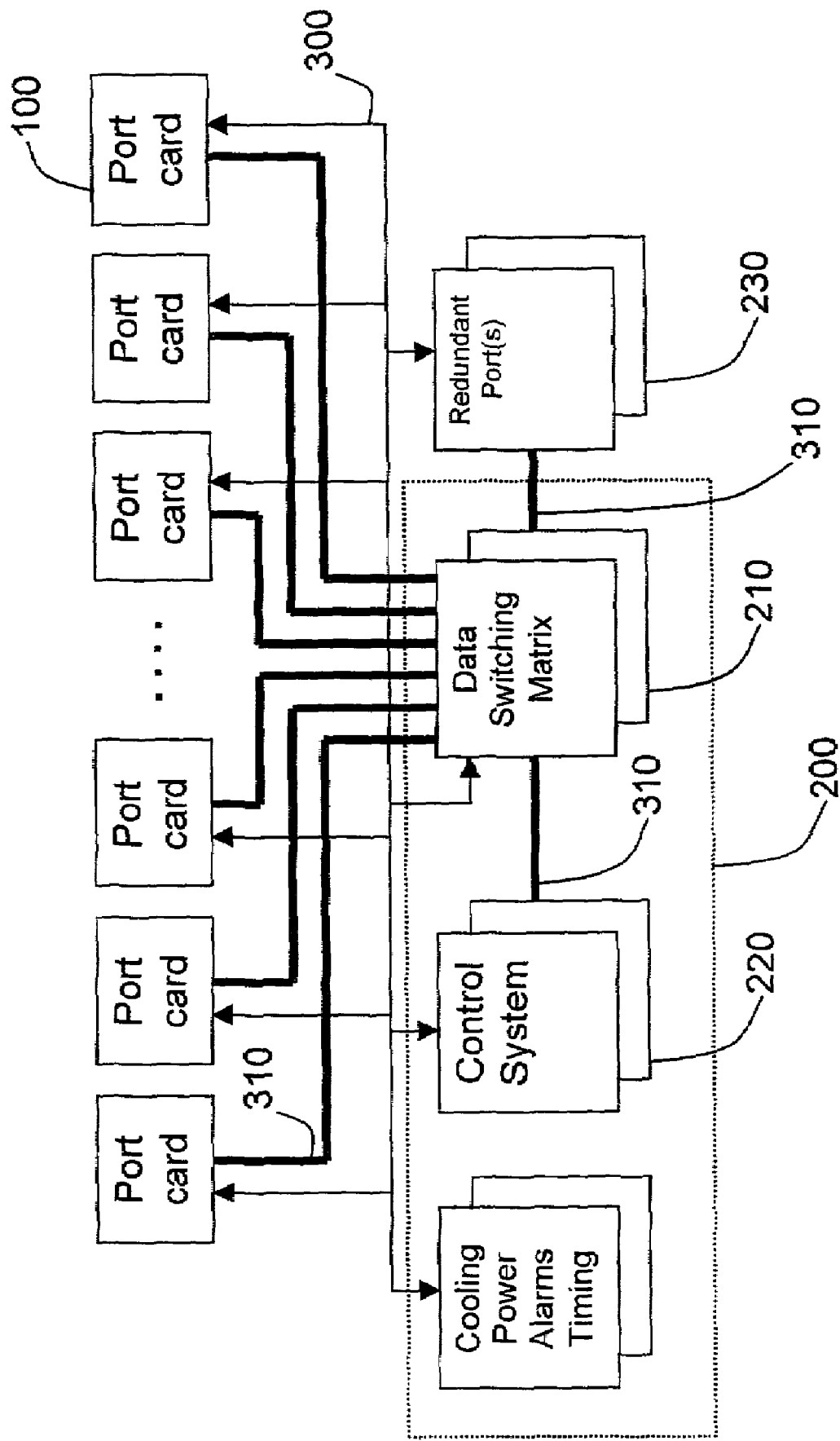
FIG. 1 illustrates an interface between port cards and a data switch.
Figure 2:
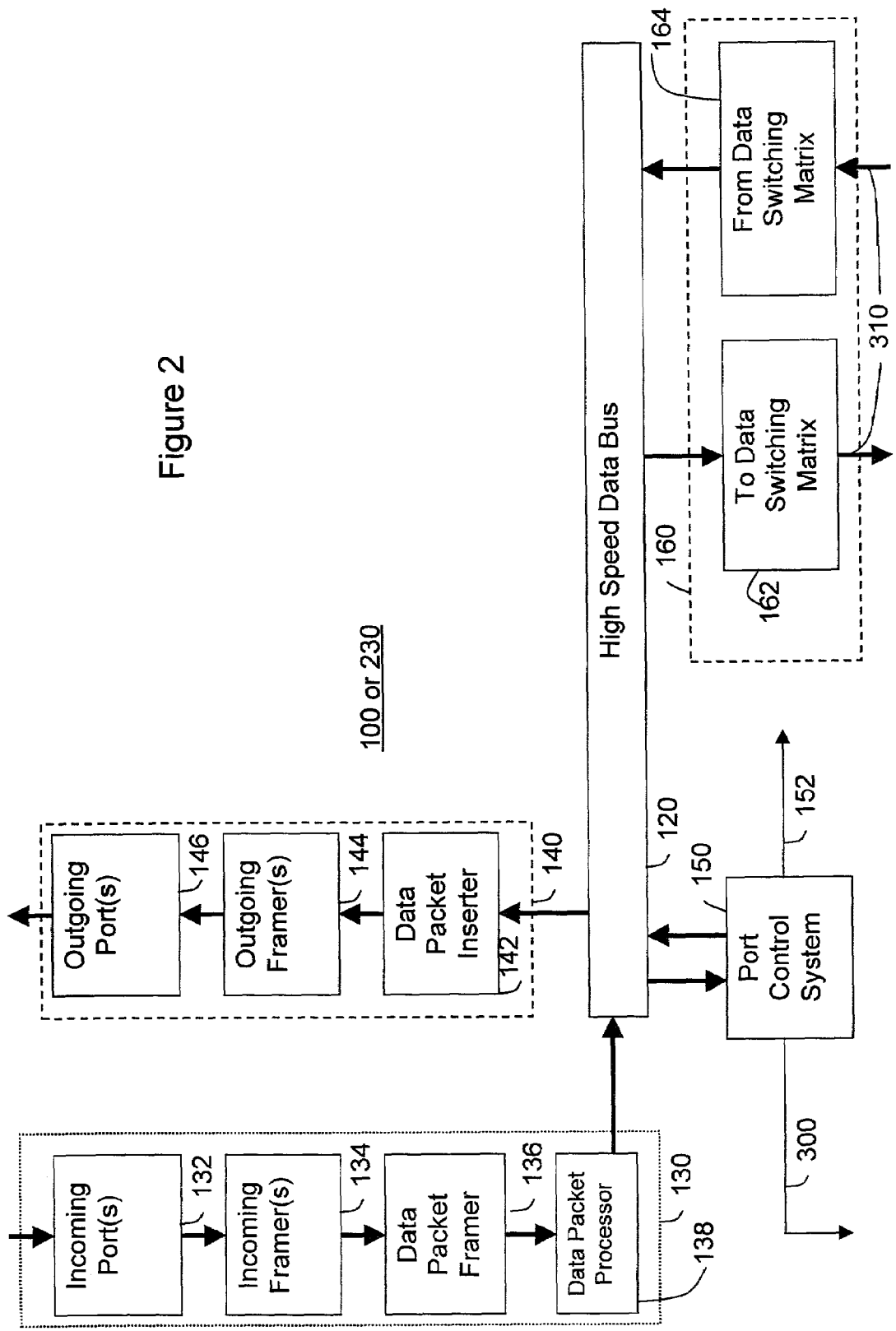
FIG. 2 depicts a block diagram of the invention.

FIGS. 1 and 2 together illustrate the preferred embodiment of the invention as an apparatus. The invention preferably includes a data switch 200 and at least two port cards 100 each having at least one intake system (receiving means) 130 capable of encapsulating each received data packet with an identification number. The data switch 200 may include one or more redundant port cards 230, which preferably are port cards 100. The port card 100 preferably includes an intra-card high speed data bus (routing means) 120, at least one outgoing system (transmitting means) 140, a port control system (controlling means) 150, and a data switch interface (interfacing means) 160. Each of these components on the port card 100 preferably is linked together with the intra-card high speed data bus 120.

Preferably, the intra-card high speed data bus 120 will have a capacity greater than two times the port I/F capacity. For example, if a port card had an OC-12 interface on it, then the port I/F capacity will be 622 Mbps and the intra-card high speed data bus 120 will preferably have a capacity greater than 1244 Mbps. This is because the intra-card high speed data bus 120 would have to carry the incoming data from the intake system 130 plus the outgoing data to the outgoing system 140 plus additional capacity for overhead such as communication containing, for example, instructions from the port control system 150. The intra-card high speed data bus 120 routes data packets based on their headings around the port card 100 including to and from the data switch interface 160.

The intake system 130 preferably includes at least one incoming port (accepting means) 132 connected to a respective incoming framer (removing means) 134, which in turn is connected to a data packet framer (separating means) 136 and a data packet processor (attaching means) 138. The data packet processor 138 preferably is connected to the intra-card high speed data bus 120. The incoming port 132 preferably receives the transmitted data packets as a signal from a link (or communications conduit) such as a T1 line, fiber optic line, V.35 or High Speed Serial Interface (HSSI), or similar as discussed above. The incoming framer 134 preferably detects and removes the link frame bits (or other representation that allows the port card 100 to synchronize with the signal) between the data bits contained in the signal.

The data packet framer 136 preferably breaks apart the incoming data into the individual data packets. In some transmission schemes, data packet framing bits (not to be confused with the link frame bits removed by the incoming framer 134) may exist and thus preferably will be removed by the data packet framer 136. In the case when no data packet framing bits are used, the data packet framer 136 preferably will detect packets using the link frame bits, or, in the case of fixed sized packets, based on the use of an error check byte in the packet.

Preferably, the data packet processor 138 analyzes the packet header and attaches or encapsulates it with an internal addressing identification number (or flag) for use within the data switch 200, the port card 100 that received the signal, and the other port cards 100 attached to the data switch 200. The identification number preferably includes destination and characteristic information for that particular data packet. The identification number will dictate where the data packet is routed within the data switch 200 and attached port cards 100. The identification number is modifiable during its travels within the data switch 200 and attached port cards 100. An alternative embodiment would have the identification number be unique for each data packet.

Referring to FIG. 2, every incoming data packet, after being received by the port card, has its size determined, and its header examined by the data packet processor 138 so that it can be tagged or encapsulated with an identification number that is routed with the packet. The identification number is used by the reception points on the intra-card high speed data bus 120 to either reject, or else accept and process the packet. If accepted by the switch matrix interface 160 the identification number may be modified as needed before being sent out over the inter-card high speed data bus 310 to the data switching matrix 210, or the control system 220 and other port card(s) 100 if the data switching matrix 210 is passive and only connects all the port cards to all the other port cards. The identification number preferably is either unique throughout the switch, or locally unique and translatable as it passes from the source port card to the switching matrix or from the switching matrix to the destination, either the port card(s) 100 or the control system 220.

Prior to assigning the identification number, the intake system 130 preferably will set up a logical path through the node from the packet source to the final destination(s) utilizing the identification number such as from an incoming port 132 on a port card 100 to the control system 220 or an outgoing port 146 on a second port card 100. When packets are received and the identification number is assigned to it, all reception points will know what to do with the packet.

As the data packet moves through the communications node, the identification number may be translated by different components within the communications node. The identification number preferably dictates the movement of the data packet, because it preferably contains complex instructions on what to do with the data packet at the respective destination(s). Preferably, the complex instructions are provided in a look-up table, which preferably is located within any component that receives data packets, or data packet destination, from the intra-card high speed data bus 120 or inter-card high speed data bus 310, providing a series of instructions based on the identification number. For example if the identification number is a eight bit number, then there are a possible 256 instructions within the look-up table that are easily located using the identification number as an address within the look-up table.

The outgoing system 140 preferably includes a data packet inserter (identification number extraction, removing or stripping means) 142, at least one outgoing framer 144, which in turn is connected to a respective outgoing port 146. The data packet inserter 142 preferably removes the internal addressing identification number and prepares the data packets for transmission. When the transmission scheme uses data packet framing bits where dictated by the protocol being used for transmission, then the data packet inserter 142 preferably will insert the data packet framing bits where dictated by the protocol being used for transmission. The outgoing framer 144 preferably inserts the link frame bits into the outgoing data bits. The outgoing port 146 then preferably transfers the data packets to another conduit, which preferably is the same conduit connected to at least one of the incoming ports 132 of that port card. Buffers may be connected and/or internal to the data packet inserter 142 and/or the outgoing framer 144 to handle the ebb and flow of data packets awaiting transmission. Additionally, the outgoing system 140 may include the capability to insert null values if there are no data packets available for transmission.

A port card 100 may be connected to more than one link. Preferably, the port card 100 will have an incoming port 132, an incoming framer 134, an outgoing framer 144, and an outgoing port 146 for each link. In an alternative embodiment, if the port card 100 is connected to two links; then the port card 100 preferably will include one incoming port, one incoming framer, one outgoing framer, and one outgoing port for one link and a second incoming port, a second incoming framer, a second outgoing framer, and a second outgoing port for the other link. The port card 100 may be connected to multiple links, and as such preferably will have a corresponding number of incoming ports, incoming framers, outgoing framers, and outgoing ports. A further alternative is that there could be multiple data packet processors and data packet inserters such that there is one of each to correspond to each link attached to that port card. Another alternative embodiment may add a data packet inserter 142 for each outgoing port.

The port control system 150 while being connected to the intra-card high speed data bus 120 preferably is also connected to a control bus 300 connecting the port cards 100 to the data switch 200 as illustrated, for example, in FIGS. 1 and 2. The control bus 300 preferably is a low speed connection primarily for transmitting instructions upon start-up and emergency conditions when the connection to the intra-card high speed data bus 120 is not working. Preferably, the control bus 300 connects the port control system 150 to the control system 220 located in the data switch 200. There preferably is an internal control bus 152 on the port card 100 that connects the port control system 150 to the other port card components. Preferably, the existence of in-band communications to the port control system 150 does not preclude the existence of a small, separate control and communications link used for emergency and startup communications. Preferably, the port control system 150 is a controller processor.

The data switch interface 160 preferably includes a path (or output) 162 for sending received data packets to the data switching matrix 210 and a path (or input) 164 for receiving data packets to be transmitted from the data switching matrix 210. The data switch interface 160 may include buffers depending upon the exact implementation of the port card into a given data switch. Both the sending path 162 and the receiving path 164 preferably connect to the data switching matrix 210 located within the data switch 200 via a inter-card high speed data bus 310.

The bandwidth of the inter-card high speed data bus 310 preferably exceeds twice the bandwidth of the port signals. Under conditions of full traffic into and out of the port card most of the data packet bus bandwidth will be used to carry this traffic. Sufficient bandwidth must remain for in-band communications between the port control system 150 and the control system 220 of the data switch 200. The control system 220 communicates with the port control system 150 using both in-band communication and out-of-band communication. When large control transfers occur, such as configuration setup and statistics download, they may be rapidly transferred to the port control system 150 via the inter-card high speed data bus 310. Normal communications and control will be able to have a more rapid turnaround using the inter-card high speed data bus 310 than what a slower, emergency back-up channel would allow on the control bus 300. When required, emergency and startup communications can be accomplished using the out-of-band channel.

FIG. 1 illustrates a data switch 200 in which the port card 100 may be used in conjunction with the data switch 200 to handle communication transmissions. The second shadow box represents the possibility that these components may have redundant copies. Redundancy does not have to be 1:1, that is, one active component and one fully capable standby component, but instead may be any ratio of N:M. The redundancy ratio variable N preferably is any integer number zero or greater and indicates the number of system components needed for full operation, and M preferably is any integer number zero or greater and indicates the number of spare system components that can substitute if one of the operating components fails. The components may have different amounts of redundancy, i.e., N and M may have different values for some components. Examples and illustrations of the N:M ratio are as follows. It is possible for a component to not have a redundant component, in which case the N:M ratio will be 1:0. Usually systems will include a single redundant processor card, in which case the N:M ratio will be 1:1. Some systems with multiple low capacity ports may have four operating ports and one standby capable of substituting for any of the operating ports, in which case the N:M ratio will be 4:1. The power supplies which provide controlled, filtered electrical power for switching systems may require three supplies to provide sufficient power and have two standby supplies, in which case the N:M ratio will be 3:2. Another example is when the data switch 200 sends all data packets to each of the port cards and requires the receiving port cards to filter out data packets not address to it, then there is no separate, physical data switching matrix 210, and in this scenario the N:M ratio will be 0:0.

An alternative embodiment is that the data packet processor 138 may decide whether it should segment, reassemble, encapsulate, extract from the received data packet, or pass it along as is prior to assigning the identification number. Preferably, this decision will be based at least in part on which procedure will provide the most efficient size of the data packet to pass the data packet through the node. The data packet processor 138 preferably will also assign the identification number at least in part based on the protocol of the data packet.

In this alternative embodiment, the data packet inserter 142 preferably performs the inverse function of the data packet processor 138. Preferably, the data packet inserter 142 will determine what protocol that data packet is in based on the identification number and, depending upon the exact implementation, which data packets are intended for that port card. If the data packet is not in the native form of the outgoing port(s) 146 on that port card, then the data packet inserter 142 preferably will segment, reassemble, encapsulate, or extract the packet as the identification number dictates to put the data packet into the native format of its port(s).

A modification of this alternative embodiment is that any other data packet reception point within the communications node preferably will determine if it must segment, reassemble, encapsulate, extract or pass through unmodified the data packet. This decision preferably is based on the identification number, which indicates whether to put the data packet into the format required for the function to occur at the reception point.

Another alternative embodiment is for the data packet processor 138 to remove the error check sequences within the packet. Examples of the error check sequence are the header error check (HEC) of the ATM cell header or the 16 bit cyclic redundancy check (CRC) at the end of a FR packet to reduce bandwidth consumption as the packet passes through the switch. Error check sequences typically are intended to catch errors caused by problems in the transmission of the packet between switching nodes, and are not needed once inside a communications node.

Figure 3:
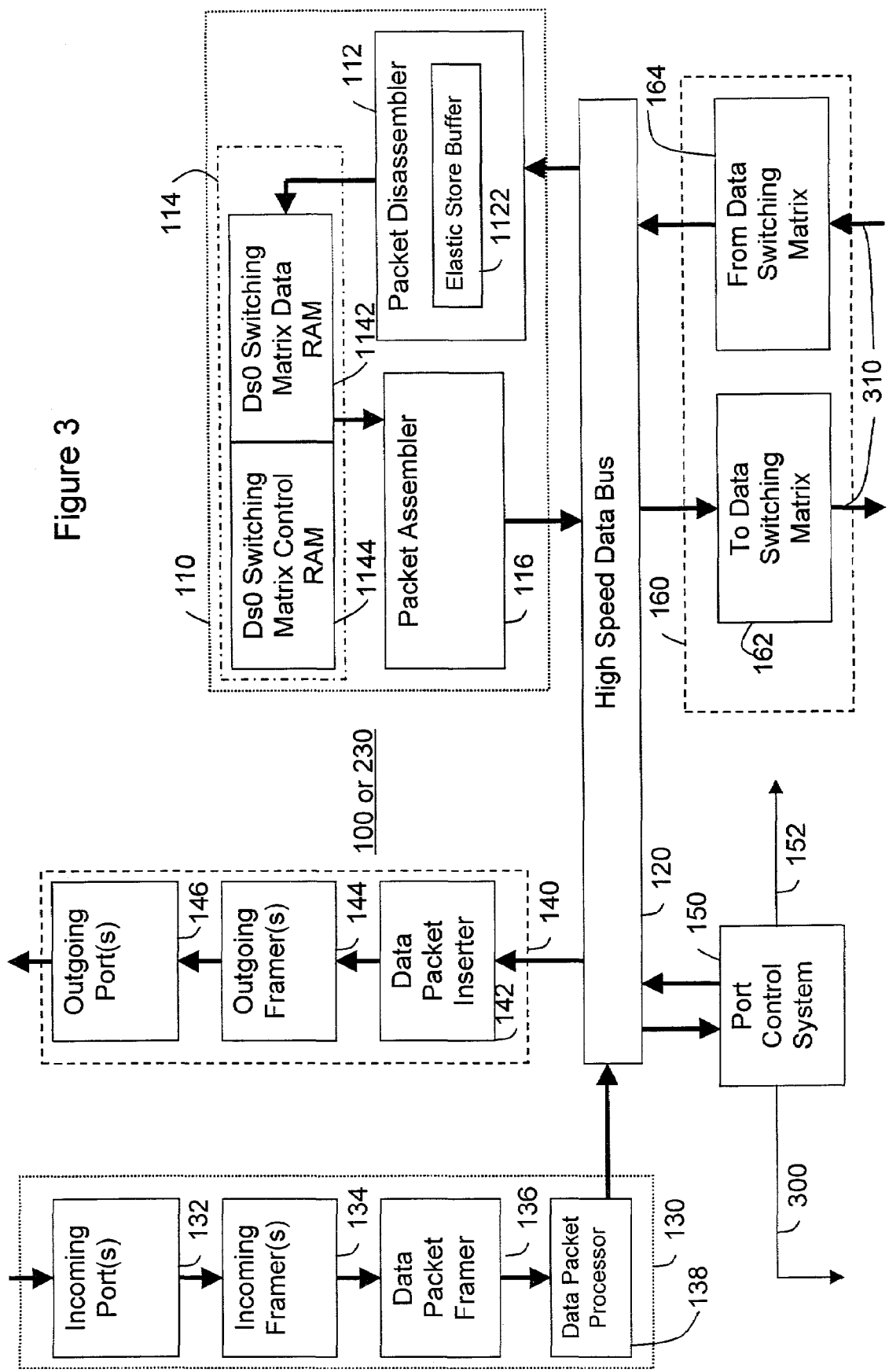
FIG. 3 illustrates a block diagram of an alternative embodiment of the invention.

Another alternative embodiment is to add a Ds0 switch (processing means) 110 to each port card as illustrated in FIG. 3. The Ds0 switch 110 communicates with the other components on the port card preferably through the intra-card high speed data bus 120. More particularly, the intra-card high speed data bus 120 allows data packets to be processed by the Ds0 switch 110 between receipt at the port card 100 and the data switching matrix 210. Also, the intra-card high speed data bus 120 also allows data packets to be processed by the Ds0 switch 110 between being sent to the port card 100 from the data switching 210 and its departure from that port card 100 out the outgoing system 140. Preferably, the intra-card high speed data bus 120 will route the data packets to the Ds0 switch 110 based upon the identification number, which preferably in this alternative embodiment will indicate the presence of Ds0 channels either explicitly or implicitly based on the routing corresponding to that identification number for that data packet.

The Ds0 switch 110 preferably includes a packet disassembler 112, a Ds0 switching matrix 114, and a packet assembler 116. The packet disassembler 112 preferably breaks apart a data packet having Ds0 channels into bytes to properly route the bytes to a specific location within the Ds0 switching matrix data RAM 1142 based on a collation of timeslots of incoming and outgoing links. The packet disassembler 112 also preferably removes the internal addressing identification number from the data packet. Preferably, the packet disassembler 112 further includes an elastic store buffer 1122 to smooth and even out the arrival (or flow) of data packets entering the Ds0 switching matrix 114. The Ds0 switching matrix 114 preferably includes a Ds0 switching matrix data RAM 1142 and a Ds0 switching matrix control RAM 1144. The Ds0 switch matrix control RAM 1144 then selects different bytes stored in the Ds0 switching matrix data RAM 1142 to be sent to the packet assembler 116 preferably based on the destination of the respective bytes. Preferably, the packet assembler 116 then gathers the grouped bytes into data packets and attaches a new identification number based on the factors used by the data packet processor 138 to assign identification numbers to data packets.

The Ds0 switch 110 is capable of receiving both incoming data packets and outgoing data packets, depending on the respective identification numbers attached to the data packets. The Ds0 switching matrix 114 can break out Ds0 channels destined for different outgoing ports into separate packets before sending the data packets to the data switch 200. Thus, each Ds0 carrying data packet, when received from the data switch 200 to the destination port card, will only have Ds0 channels that are destined to depart from that destination port card. This in turn reduces the bandwidth consumed on the data switch 200 and destination port card to reject data packets not departing from that destination port card. The Ds0 switching matrix 114 can groom Ds0 channels in data packets traveling through the port card 100 in both directions simultaneously.

The Ds0 switching matrix 114 can also accept Ds0 carrying packets from the data switching matrix 210. The Ds0 switching matrix 114 will remove Ds0 channels destined for different downstream nodes from various data packets and preferably combine all of those destined for one downstream node together in a single data packet depending upon data packet limitations and protocols. Data packets, which have Ds0 channels, received from the data switching matrix 210 can be combined into fewer, larger data packets to reduce the header processing load on downstream nodes, for port cards that handle variable sized data packets. If the port card uses fixed sized data packets, then the data packets can be combined into more channels per data packet to reduce the number of frames per data packet and thus latency, and also to reduce the amount of unused capacity in the payload of the packet.

In a properly designed network, the Ds0 switching matrix 114 on each port card 100 only has to breakdown (or re-combine) a fraction of the Ds0 channels entering or leaving the port card 100. By combining together Ds0 channels that are destined for the same outgoing port on the next (or next several) switch(es) those packets carrying these Ds0 channels do not have to be broken down and recombined on the next (several) switch(es).

The capacity of the switching matrix of a Ds0 channel on the port will vary depending on the capacity of the port interface(s). If the entire contents of a common industry signal, the OC-48 or STM-12, which runs at approximately 2.5 gbps, carries Ds0 traffic, it would carry 16K Ds0 channels with little room left for anything except overhead. This would still allow for a single data RAM to exist in this port card, making the design simple and efficient.

A properly designed network will organize, as soon as possible, data channels destined for a single end user as close to the source as it can. Thus, most Ds0 carrying data packets will not have any need to be switched by no more than a few Ds0 switching matrices. Thus, a 16K Ds0 switching matrix can actually support port interfaces of a much higher bandwidth, such as the OC-192 port, which runs at 10 gbps.

In another alternative embodiment, if there is insufficient capacity left in the Ds0 switching matrix on the port card to groom together Ds0 channels for a single outgoing port on a downstream switch, then the excess Ds0 carrying data packet(s) can bypass the Ds0 switching matrix. The excess Ds0 carrying data packet(s) preferably will go straight out the port, and the job of grooming the Ds0 channels within it preferably will be left to the next downstream switch.

Another alternative embodiment is to combine the data packet inserter 142 and the outgoing framer 144 into one component (means for preparing each packet for transmission). Preferably, the combined component will prepare the data packets for transmission as a signal.

Figure 4:
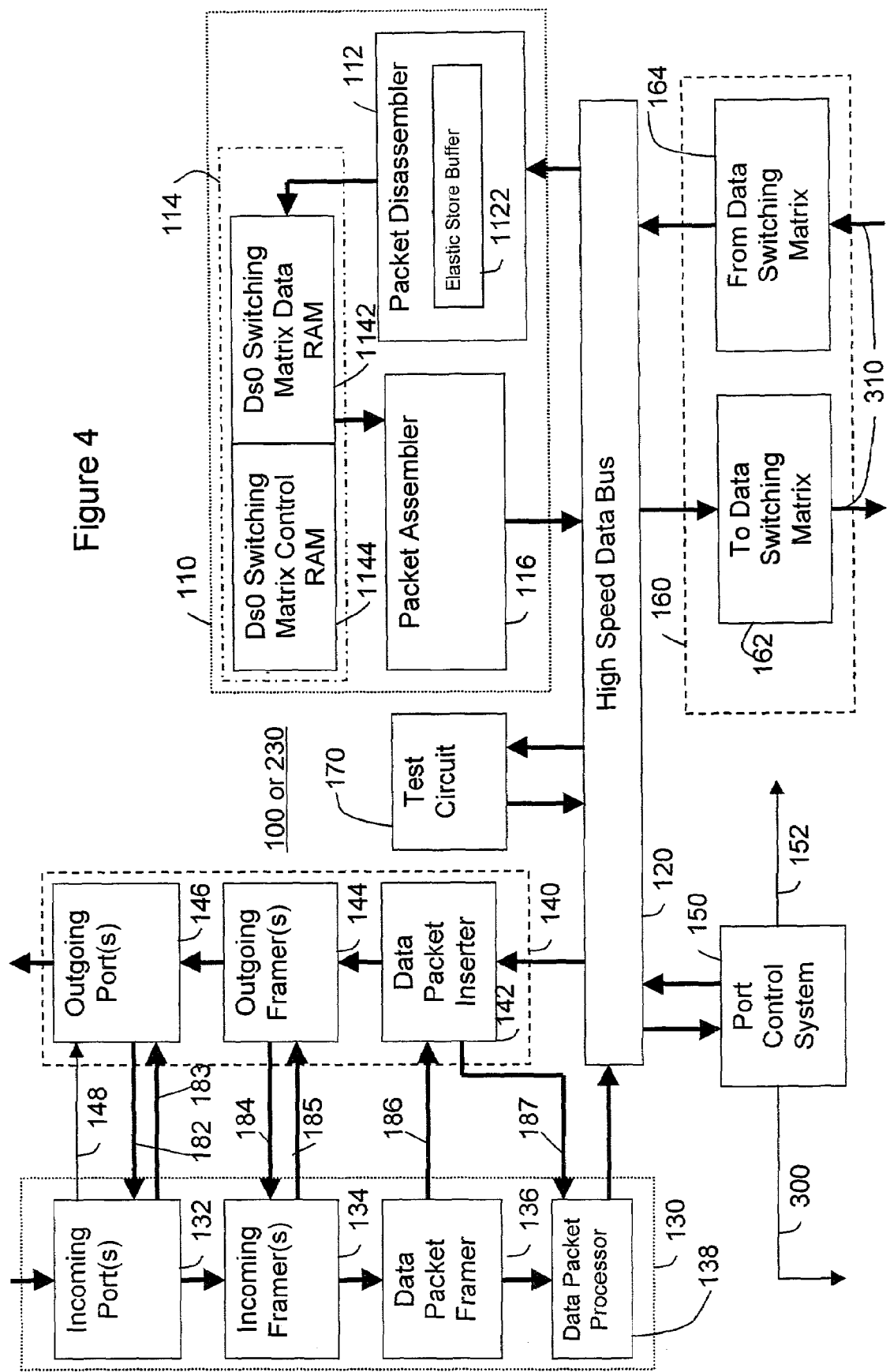
FIG. 4 depicts a block diagram of an alternative embodiment of the invention.

Another alternative embodiment adds a test circuit 170 to the port card 100 and is illustrated, for example, in FIG. 4. The test circuit 170, if present, preferably is connected to the intra-card high speed data bus 120. The test circuit 170 preferably is controlled by the port control system 150 via the control bus 152. The test circuit 170 may be programmed to generate and run test patterns through the port card 100 and even into the data switch 200 to ensure that the port card 100 is functioning properly. The testing preferably occurs during slow periods in data packet transmission and processing or when the card is running through self testing and diagnostics after being plugged into a data switch, but prior to being allowed to carry customer traffic. Preferably, the test circuit 170 in conjunction with the port control system 150 will be programmable to run the test and verification patterns at predetermined times to perform regular maintenance, for example, the testing might occur at 1:00 a.m. each day. The test circuit 170 generates test data packets complete with a header and internal addressing identification number. The test data packet will eventually return to the test circuit 170 so that it may verify both the path and that the switching functions are operating properly.

The output of the packet assembler 116 may be routed back to the input of the packet disassembler 112 to allow for repeated loops of traffic to be established. The repeated loops enable the test circuit 170 to test all storage locations within the Ds0 switching matrix RAM 1142 for extended lengths of time, which is a form of bit error rate (BER) testing. This is accomplished by having the internal addressing identification number set in a test data packet such that it cycles through the Ds0 switch 110 through a series of channels to allow each location within the Ds0 switching matrix data RAM 1142 to be tested.

Preferably, the internal tests of this alternative embodiment may be run concurrently with live traffic.

Another alternative embodiment, also illustrated in FIG. 4, is to include loopback paths such as 182, 183, 184, 185, 186, 187 between the line interface components of the intake system and the outgoing system. An actual implementation of these loopback paths does not need to include all of the possible loopback paths 182, 183, 184, 185, 186, 187. The loopback paths 182, 184, 186 allow data packet loopback equivalents to occur through the passing of special test packets generated by the test circuit 170 and sent to the outgoing system components prior to looping over to a respective intake system component. The loopback paths 183, 185, 187 preferably are for network testing between communication nodes.

With the inclusion of the test circuit 170 and the loopback paths 182, 184, 186 on each port card 100, the ability of the port card 100 to deliver packets to any packet destination on the port card and allow for the testing of every data path on the port card 100 including paths to the data switch 200 is possible.

In addition, the loopback path 183 together with a recovered clock signal over line 148 will allow the physical signal coming into the port card to be duplicated and sent back out to the sending communication node. Similarly, the payload content of an incoming signal may be extracted from the framing portion of the signal, then re-injected into an outgoing signal with new framing using loopback path 185. Similarly, the data packet content of an incoming signal may be extracted from the data bit portion of the signal, then re-injected into an outgoing signal using loopback path 187. Also, the loopback paths 183, 185 may be used to provide loopback tests where data packet organization/structure is not realizable.

Furthermore, any path combination may be developed for the purpose of verifying all paths through the port card 100 and data switch 200 to verify the integrity of the data paths. The verification of the data paths will verify that all communication and control paths are also working correctly. The means for testing and verifying may include any of the following individually or in combination: test circuit 170, loopback path 182, loopback path 184, and loopback path 186.

In another alternative embodiment also illustrated in FIG. 4, a line (or connection) 148 connects the incoming port 132 to the outgoing port 146 for distributing a clock signal for use in transmitting signals. Preferably, the recovered clock signal on line 148 may be used to run loopback tests or may be used to provide a clock for the outgoing port 146 while carrying live traffic. Preferably, the outgoing port 146 may use the recovered clock signal from line 148 or another clock source to transmit the link signal out of the port card 100 to the next downstream communications node.

Figure 5:
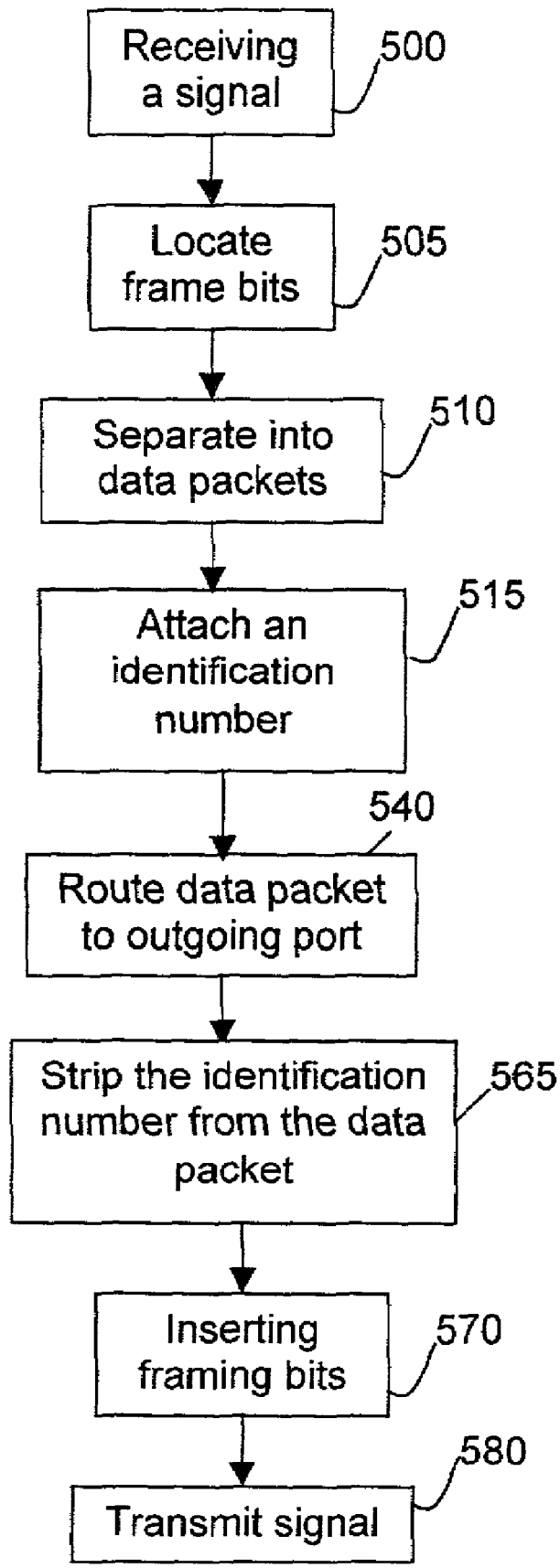
FIG. 5 illustrates a flowchart of the preferred steps for performing the invention.

FIG. 5 illustrates the operational steps for a preferred embodiment of the invention. The first step 500 is to receive a telecommunications signal at a node from another node, customer premise equipment, or a communications conduit.

The second step is to break-up or separate the signal into the data packets preferably based on the location of the frame bits, steps 505 and 510. Preferably when the signal is separated, step 510, into the different data packets, an identification number is attached, step 515, to each data packet. The identification number preferably provides a representation or indication regarding the data packet destination and characteristic as discussed above. Next preferably, the data packet is sent to the data switch for routing to the appropriate outgoing port, step 540, based on the identification number.

The last step preferably is for the data packet to be transmitted towards the next communications node. This step preferably includes removing (or stripping) the attached identification number, step 565; inserting framing bit(s) based on the particular transmission protocol, step 570; and transmitting the signal to the next communications node most likely through a communications conduit, step 580. Step 570 may include inserting data packet framing bit(s) as determined by the particular transmission protocol being used. Preferably, step 570 will include inserting physical link framing bits between data bits.

Step 540 may be expanded to include having a receiving port card interface with a data switch, which in turn interfaces with a transmitting port card.

The preferred method also allows for two types of control signals to be exchanged within the node. The first step is to transmit a first type or class of control signals such as configuration setup or statistical downloads through the data bus. The second step is to transmit a second type of control signals, signals not falling in the first type, through an out-of-band channel.

Figures 6, 7:
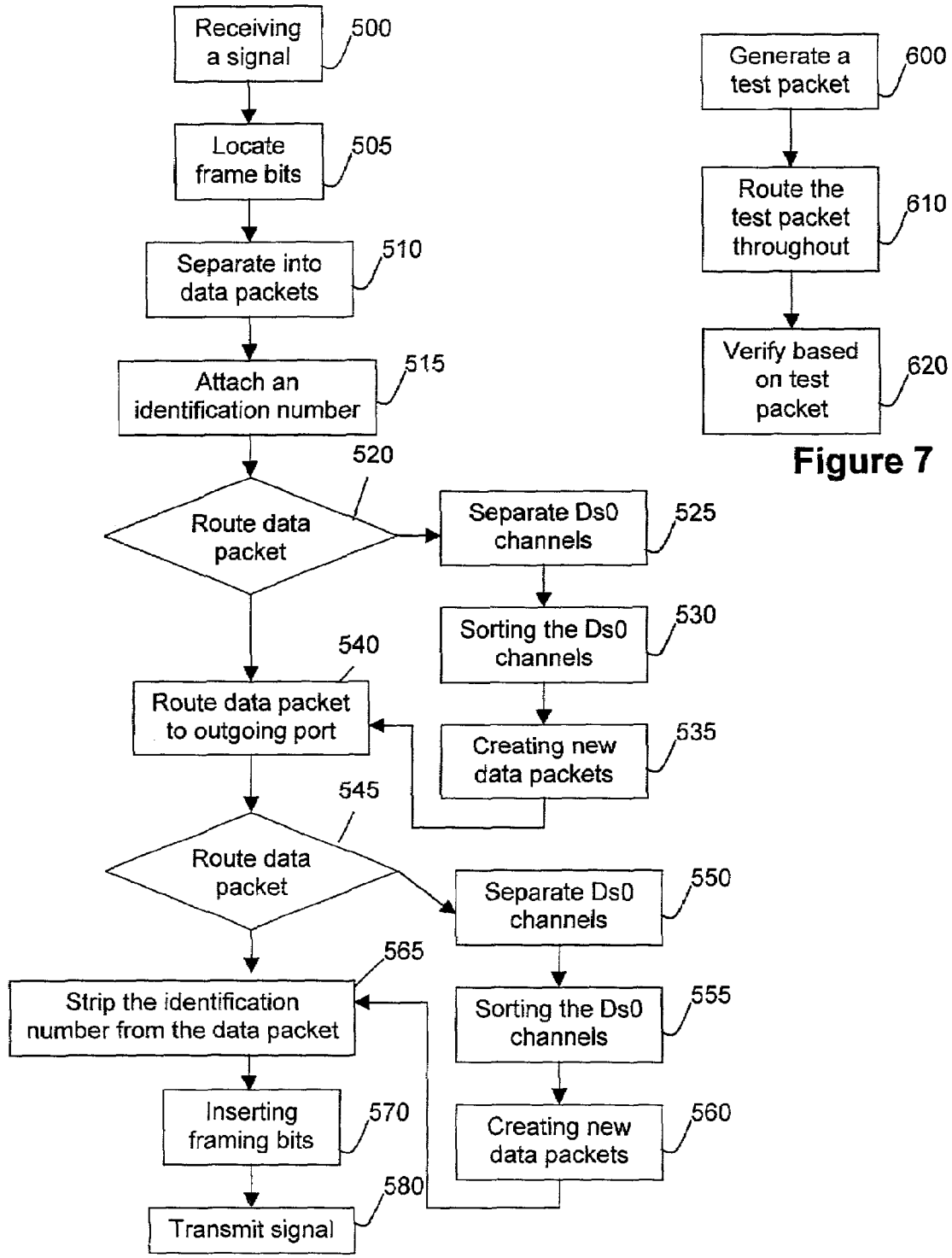
FIG. 6 depicts a flowchart for an alternative method for performing the invention.
FIG. 7 illustrates a flowchart having steps for performing an alternative embodiment of the invention.

In an alternative embodiment, the method may be expanded as illustrated in FIG. 6 to include additional steps for processing Ds0 channels. The identification number preferably is used by the intra-card high speed data bus 120 to route the data packet as part of the third step 520. Preferably, the data packet is sent to a Ds0 switch when the data packet includes Ds0 channels that will need to be separated and sent to different outgoing ports from that node preferably based at least in part on the identification number assigned in step 515. Preferably, the Ds0 switch, as discussed above in connection with FIG. 3, repackages the Ds0 channels into new data packets and assigns new identification numbers. Preferably, the repackaging includes separating the Ds0 channels from each other, step 525; sorting the Ds0 channels based on their destination nodes, step 530; and organizing them into new data packets, step 535.

This alternative method also preferably will include additional steps to be performed by the transmitting port card preferably as dictated by the identification number. These additional steps preferably are added after step 540 of the preferred method. The data packet passes through another port card (transmitting port card) and may be diverted to a Ds0 switch on that port card, step 545. The diversion preferably will occur if 1) the data packet is small and for efficiencies purposes it will be combined with other similar destined data packets; 2) the data packet has excess room in the case of a fixed size data packet and more Ds0 channels may be added without increasing the data packet size; 3) Ds0 channels in the data packet are destined for the same outgoing port at the next node; or 4) there are more than one outgoing port and the data packet includes Ds0 channels destined for different outgoing ports from that port card. Conditions 1 and 2 are examples of insufficient Ds0 channels being present within the data packet.

In another alternative method, the method is expanded to include the testing steps shown in FIG. 7. The first testing step 600 preferably is to generate a test packet, but an alternative to this would be to have a previously stored/created test packet(s) resident on the port card to be used for testing purposes. Next, the test packet preferably is routed throughout the port card and node to test at least one pathway that data packets might travel within the node, step 610. Preferably, the results and changes made to the test packet will allow for verification of the data path and operation of the port card and node, step 620. Preferably, the test packets may be sent to any data packet destination within either the port card or node, and preferably then return to the source of the data packet for verification. The source preferably is either a test circuit or the port control system.

A further alternative method is to combine the last two alternative embodiments to loop the test packets through the Ds0 switch to perform bit error rate testing when the Ds0 switch is present either on the port card or as part of the data switch.

In yet another alternative method, step 505 becomes removing the frame bits, while step 510 becomes separating the remaining bits into packets, for example, data packets. Step 505 may more preferably be removing link frame bits from the signal and depending on the transmission protocol, also, removing data packet framing bits.

Another novel feature of the invention is making the packet transmission through the switch independent of the packet protocol. To accomplish this, any and all data packet sources in the switch preferably encapsulates the data packet with information that includes the identification number and the packet boundaries (when the packet starts and when it ends) of the packet. For this reason, it can carry any existing or future protocol between ports without having to change the packet before passing through the switching matrix. Alternatively, the identification number and packet boundary information can be passed from any data packet source to any data packet destination concurrently with the data packet, such as providing parallel, additional paths through any high speed data path to carry this information.

Both variable sized packets, such as FR or IP, as well as fixed sized packets, such as ATM, can be carried through the switch concurrently.

There are five data packet sources and five data packet destinations on the port card 100 when the alternative embodiments are included within the invention. The sources are the incoming port signal(s) from the outside world, the output of the Ds0 switching matrix 114, the output of the data switching matrix to the port card 164, the output of the test circuit 170, and the output of the in-band interface to the port control system. The destinations are the outgoing port signal(s) to the outside world, the input to the Ds0 switching matrix 114, the input to the data switching matrix from the port card 162, the input to the test circuit 170, and the input to the in-band interface to the port control system.

When the communications conduit is a V.35 or high speed serial interface, the clock and/or framing signals are preferably placed in parallel with one or more data signals for transmission between switches placed in very close proximity to each other.

While various embodiments of the present invention have been described above, it should be understood that they have been presented by way of example only, and not limitation. The various described alternative embodiments may be combined together into new alternative embodiments. Thus, the breadth and scope of the present invention should not be limited by any of the above-described exemplary embodiments, but should be defined only in accordance with the following claims and their equivalents.

I claim:

1. A port card comprising:
   means for receiving packets, where the means for receiving packets receives at least one of an asynchronous transmission or a synchronous transmission, said receiving means includes:
   means for assigning an identification to each received packet, where the identification is representative of internal addressing information,
   means for accepting at least one signal having packets,
   means for removing frame bits within the signal, and
   means for separating remaining data bits left within the signal into individual packets,
   means for processing the packets, where the identification is modifiable by said processing means;
   means for transmitting packets as at least one of an asynchronous transmission or a synchronous transmission, said transmitting means includes:
   means for removing the identification attached to each packet, and
   means for preparing each packet for transmission,
   means for routing information between said receiving means, said transmitting means, and said processing means, where the information routed by said routing means includes packets, and said routing means routes packets based on the identification of the packet assigned by said assigning means;
   means for disassembling packets having Ds0 channels into bytes;
   means for switching the bytes; and
   means for assembling the switched bytes into new packets.
2. The port card according to claim 1, where said processing means includes a Ds0 switch.
3. The port card according to claim 1, further comprising:
   means for controlling an operation of said port card; and means for testing and verifying data paths and functionality of said port card.

4. The port card according to claim 1, where said receiving means and said transmitting means use a same transfer mode type.

5. A method comprising:
routing individual packets with first Ds0 channels to a first Ds0 switch on a first port card;
switching the first Ds0 channels into new packets headed to a same outgoing port of a communications node when the packets include at least one Ds0 channel destined for another communications node; and
manipulating second Ds0 channels of packets in a second Ds0 switch that is on a second port card into at least one of larger packets, packets with more channels for fixed size packets, or packets destined for a same outgoing port at a next communications node, where manipulating the second Ds0 channels includes:
separating the second Ds0 channels within each packet,
sorting the second Ds0 channels based on a downstream communications node to which the second Ds0 channels are being sent,
organizing the sorted second Ds0 channels into new packets, and
attaching a new identification to each new packet.

6. The method according to claim 5, further comprising:
receiving a signal at the communications node;
separating the signal into packets;
assigning an identification to each packet based on a destination for the packet;
routing the packets based on the identification;
removing the identification from each packet; and
transmitting the packets as a signal to the next communications node.

7. The method according to claim 6, where routing packets includes referring to a table to determine the routing and handling of the packets using the identification as an address within the table.

8. The method according to claim 6, further comprising:
determining a protocol in which the packets have been transmitted; and
changing the protocol of the packets when the protocol is different from a protocol of the communications node.

9. The method according to claim 6, further comprising:
removing error correction bits from received packets prior to routing packets based on the identification; and
where assembling the packets into the signal includes adding the error correction bits into a header of the packets prior to transmitting the signal.

10. The method according to claim 5, where routing individual packets to a first Ds0 switch includes determining whether Ds0 channels are included within the packet.

* * * * *